United States Patent
Oh et al.

(10) Patent No.: US 8,121,035 B2
(45) Date of Patent: Feb. 21, 2012

(54) APPARATUS AND METHOD FOR PACKET BUFFER MANAGEMENT IN IP NETWORK SYSTEM

(75) Inventors: Jong-Sang Oh, Suwon-si (KR); Sun-Gi Kim, Seoul (KR); Yong-Seok Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 264 days.

(21) Appl. No.: 12/068,739

(22) Filed: Feb. 11, 2008

(65) Prior Publication Data

US 2008/0192765 A1   Aug. 14, 2008

(30) Foreign Application Priority Data

Feb. 12, 2007 (KR) .................... 10-2007-0014294

(51) Int. Cl.
*H04L 12/26* (2006.01)
*H04L 12/54* (2006.01)
*G06F 15/167* (2006.01)
*G06F 3/00* (2006.01)

(52) U.S. Cl. ........ 370/235; 370/412; 370/428; 709/213; 709/235; 710/29; 710/56

(58) Field of Classification Search ............... 370/235, 370/412, 428; 709/213, 235; 711/29, 56
See application file for complete search history.

(56) References Cited

U.S. PATENT DOCUMENTS

| | | | | |
|---|---|---|---|---|
| 5,136,702 A | * | 8/1992 | Shibata | 711/3 |
| 5,696,764 A | * | 12/1997 | Soumiya et al. | 370/395.41 |
| 5,719,853 A | * | 2/1998 | Ikeda | 370/229 |
| 5,799,210 A | * | 8/1998 | Cohen et al. | 710/56 |
| 5,838,677 A | * | 11/1998 | Kozaki et al. | 370/389 |
| 5,838,994 A | * | 11/1998 | Valizadeh | 710/56 |
| 6,219,728 B1 | * | 4/2001 | Yin | 710/52 |
| 6,363,075 B1 | * | 3/2002 | Huang et al. | 370/412 |
| 6,473,432 B1 | * | 10/2002 | Nishimura et al. | 370/412 |
| 6,636,883 B1 | * | 10/2003 | Zebrowski, Jr. | 718/102 |
| 6,687,254 B1 | * | 2/2004 | Ho et al. | 370/412 |
| 7,031,331 B2 | * | 4/2006 | Schaub | 370/412 |
| 7,206,890 B2 | * | 4/2007 | Mathiske | 711/6 |
| 7,286,511 B2 | * | 10/2007 | Zhong et al. | 370/338 |
| 7,301,906 B2 | * | 11/2007 | Nation et al. | 370/235 |
| 7,346,067 B2 | * | 3/2008 | Chung et al. | 370/412 |
| 7,349,416 B2 | * | 3/2008 | Jacobs et al. | 370/412 |

(Continued)

FOREIGN PATENT DOCUMENTS

KR   100211978   5/1999

*Primary Examiner* — Alpus H Hsu
(74) *Attorney, Agent, or Firm* — H.C. Park & Associates, PLC

(57) ABSTRACT

An apparatus, computer program and method for packet buffer management in an IP network system. The apparatus includes at least one link queue buffer, a shared buffer, a buffer state detector, and a buffer manager. The at least one link queue buffer is allocated a buffer of a packet stored in a memory. The shared buffer is excessively allocated when exceeding a minimum buffer threshold value. The buffer state detector determines whether a buffer value stored in a link queue buffer of a corresponding link exceeds a preset minimum buffer threshold value. The buffer manager sets the shared buffer to be included in the link queue buffer if the stored buffer value exceeds the preset minimum buffer threshold value.

6 Claims, 6 Drawing Sheets

U.S. PATENT DOCUMENTS

| | | | |
|---|---|---|---|
| 7,414,973 B2 * | 8/2008 | Hart et al. | 370/235 |
| 7,489,628 B2 * | 2/2009 | Pirbhai et al. | 370/229 |
| 7,492,779 B2 * | 2/2009 | Schzukin et al. | 370/412 |
| 7,546,400 B2 * | 6/2009 | Suzzoni et al. | 710/52 |
| 2005/0083958 A1 * | 4/2005 | Drori et al. | 370/412 |
| 2007/0280277 A1 * | 12/2007 | Lund | 370/412 |

* cited by examiner

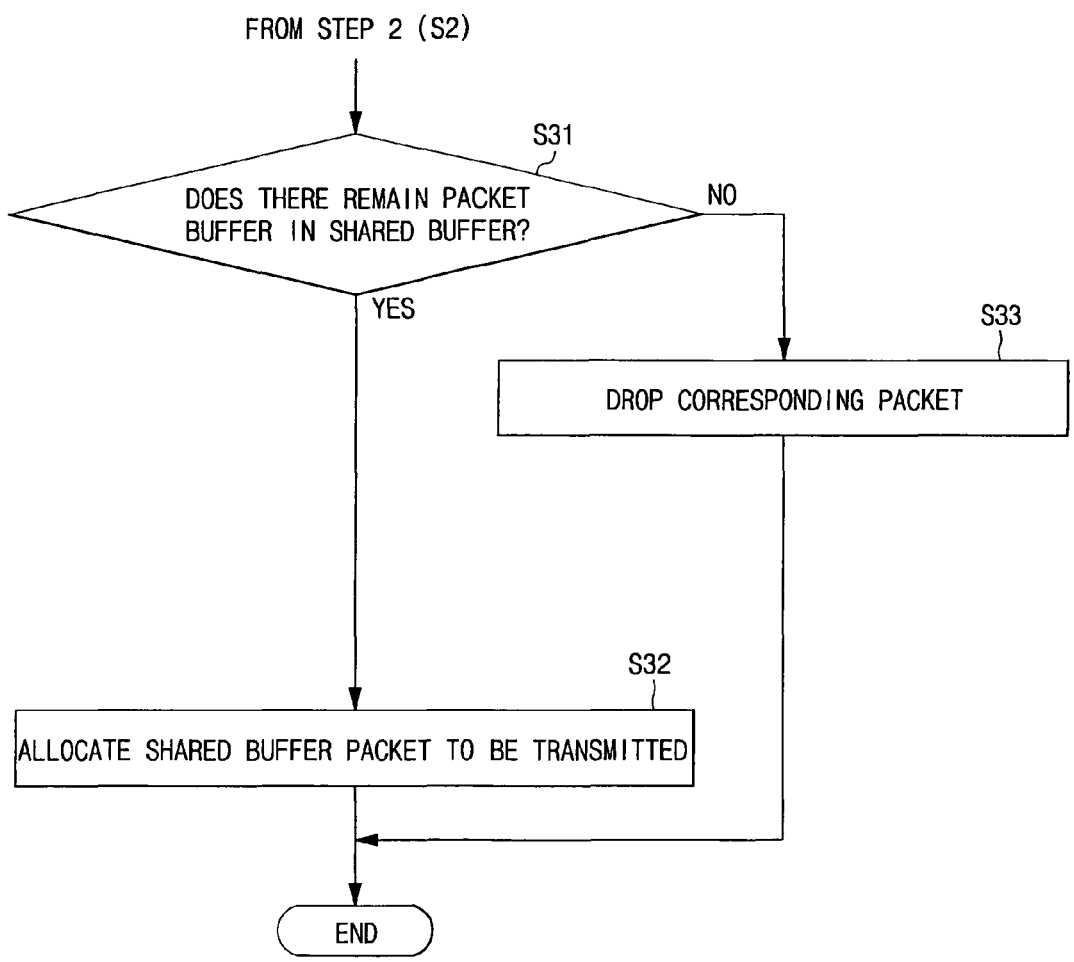

APPARATUS AND METHOD FOR PACKET BUFFER MANAGEMENT IN IP NETWORK SYSTEM

CLAIM OF PRIORITY

This application makes reference to and claims all benefits accruing under 35 U.S.C. §119 from an application for "APPARATUS AND METHOD FOR PACKET BUFFER MANAGEMENT IN IP NETWORK SYSTEM" earlier filed in the Korean Intellectual Property Office on Feb. 12, 2007 and there duly assigned Serial No. 2007-0014294.

BACKGROUND OF THE INVENTION

1. Field of the Invention

The present invention relates to an apparatus and method for packet buffer management in an Internet Protocol (IP) network system.

2. Description of the Related Art

One of required features of next-generation Internet is high reliability.

With an increase of higher value-added mission-critical traffic, real-time traffic, and high-priority traffic, a need for stably servicing the traffics is increasing.

As a network evolves into a high speed and large capacity network, the network processes much more data transmission. This leads to traffic congestion in a network zone, causing a loss of user data and causing the degradation of performance between end-to-end users.

The Next generation of the Internet basically requires an efficient and effective mechanism for, upon the occurrence of network failure, detecting the failure within a short time, recovering from the failure within a short time, and continuing to provide a service.

Thus, even when congestion occurs at a specific link of a network due to a flood of user traffic, it can be regarded as another cause of a network failure.

In the event that an amount of user data flooding in a link corresponding to an optimal path exceeds an optimal transmission degree of the link, user data may be lost. Such a loss of user data leads to data re-transmission between end-to-end networks, affecting a quality of network service.

Thus, when congestion occurs because of the flood of user data, how long time packets are stored with no packet loss for each link is considered a factor of significance.

In a conventional network system, when traffic floods into a specific zone of a network and congestion occurs at a corresponding port, packets are processed as much as they can be stored in a packet queue for each corresponding port and other packets exceeding a storage capacity are dropped. Undoubtedly, a variety of algorithms such as Random Early Detection (RED) and Weighted RED (WRED) have been developed as a packet drop way.

However, how long time packets can be stored before being dropped is basically a factor of significance. For this, there is needed a consideration for how efficiently a limited packet buffer is managed.

FIG. 1 shows a management scheme for a packet buffer allocated every link and used in a conventional network system.

Assuming that there are 'm' number of queues at a link and the queue has the limited 'n' number of packet buffers, each queue is set, at the time of initial system driving, to store the maximum 'n/m' number of packet buffers. If congestion occurs at the link, packets exceeding the 'n/m' number are dropped.

SUMMARY OF THE INVENTION

The present invention solves the foregoing problems with the prior art and therefore the present invention provides an apparatus and method for packet buffer management in an IP network system, for efficiently managing a limited packet buffer.

According to an aspect of the invention for realizing the above objects, there is provided an apparatus for packet buffer management in an IP network system with at least one port having an internal queue. The apparatus includes at least one link queue buffer, a shared buffer, a buffer state detector, and a buffer manager. The at least one link queue buffer is allocated to a buffer of a packet stored in a memory to transmit the packet. The shared buffer is excessively allocated when exceeding a minimum buffer threshold value of the link queue buffer. The buffer state detector determines whether a buffer value stored in a link queue buffer of a corresponding link exceeds a preset minimum buffer threshold value. The buffer manager sets the shared buffer to be included in the link queue buffer of the link if the buffer value stored in the link queue buffer of the link exceeds the preset minimum buffer threshold value.

The link queue buffer and the shared buffer may be set with buffer values divided within the capacity of a memory storing a packet.

According to another aspect of the invention for realizing the above objects, there is provided a method for buffer management in a network system using a link queue buffer and a shared buffer. The method includes steps of: upon selecting a packet transmission link, determining whether the number of buffers being on transmission standby in a corresponding link queue buffer exceeds a minimum buffer threshold value; setting the shared buffer as the corresponding link queue buffer if the number of buffers being on transmission standby in the corresponding link queue buffer exceeds the minimum buffer threshold value; and allocating the shared buffer to a packet to be transmitted.

The method may further include, if the number of buffers being on transmission standby in the corresponding link queue buffer does not exceed the minimum buffer threshold value, allocating the link queue buffer to a packet to be transmitted.

The step of allocating the shared buffer to the packet to be transmitted may include steps of: determining whether there remains a packet buffer in the shared buffer; and allocating the shared buffer to a buffer of a packet to be transmitted if there remains the packet buffer in the shared buffer.

The method may further include, if there does not remain the packet buffer in the shared buffer, dropping a corresponding packet.

The link queue buffer and the shared buffer may be set with buffer values divided within the capacity of a memory storing a packet.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 5 is a flow diagram illustrating a process of allocating a shared buffer in the packet buffer management method of FIG. 4.

DETAILED DESCRIPTION OF THE PREFERRED EMBODIMENTS

The present invention will now be described more fully hereinafter with reference to the accompanying drawings, in which preferred embodiments of an apparatus and method for packet buffer management in an IP network system of the invention are shown. It will be understood by those having an ordinary knowledge in the art that a system described below is merely exemplified for describing the invention with no limit to the scope of the present invention.

Figure 1:
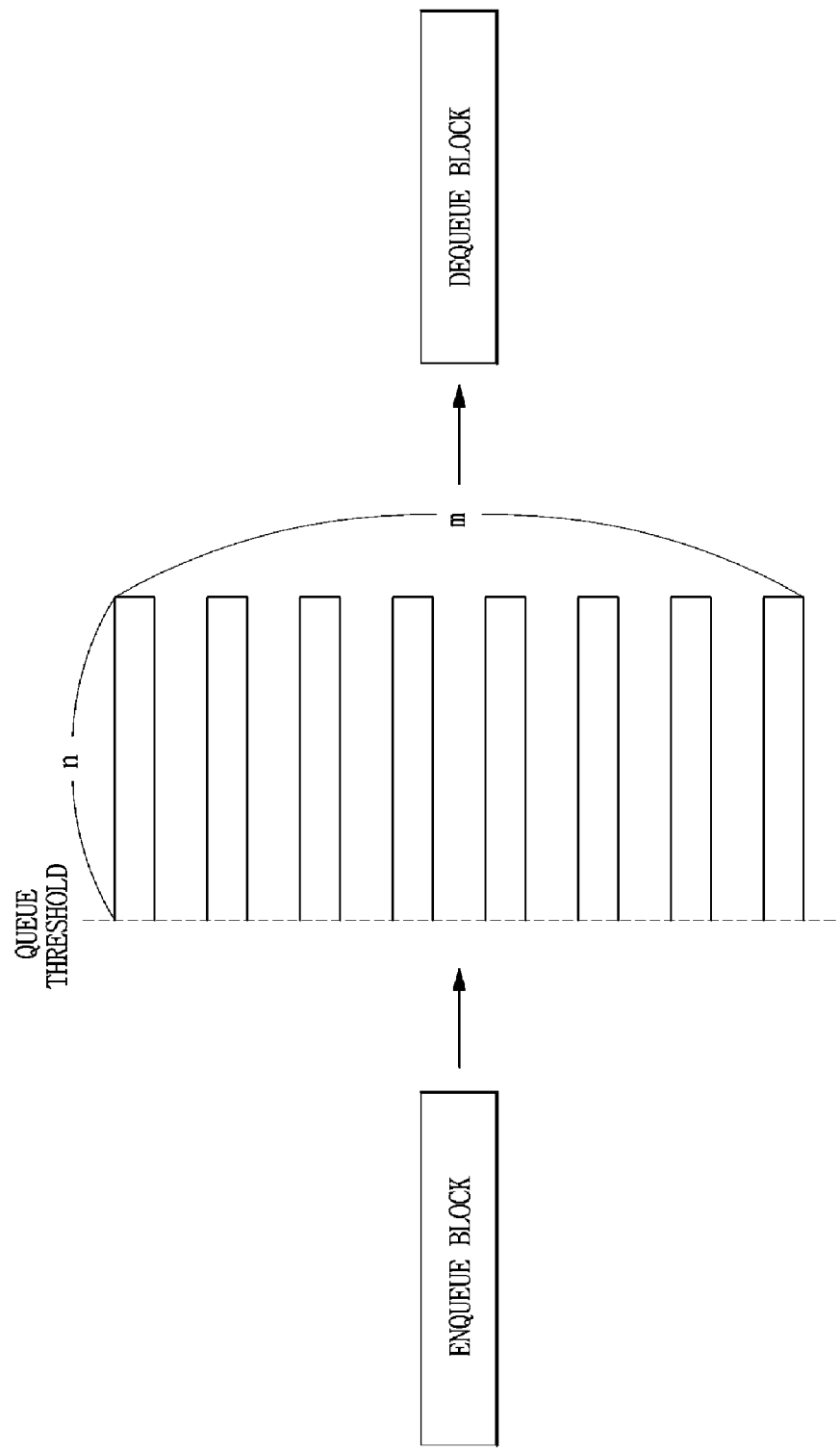
FIG. 1 is a diagram illustrating a conventional packet management scheme in an IP network system.
Figure 2:
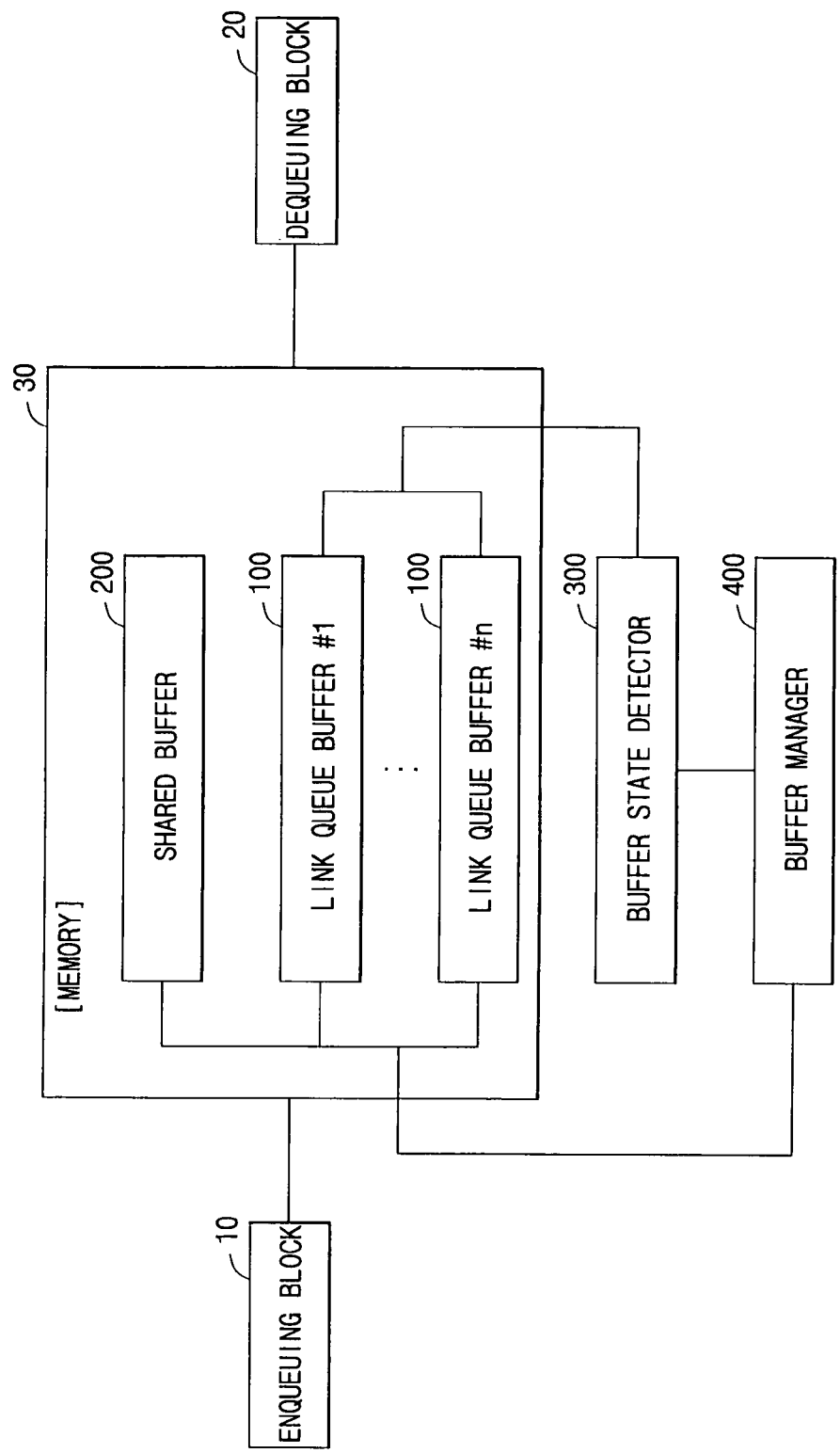
FIG. 2 is a block diagram illustrating construction of an apparatus for packet buffer management in an IP network system according to the present invention.

FIG. 2 is a block diagram illustrating construction of an apparatus for packet buffer management in an IP network system according to the present invention. The packet buffer management apparatus includes at least one link queue buffer 100, a shared buffer 200, a buffer state detector 300, and a buffer manager 400. The packet buffer management apparatus further includes an enqueuing block 10, a dequeuing block 20, and a memory 30.

The enqueuing block 10 enqueues a packet to a packet queue buffer of each link to have to transmitted the packet.

The dequeuing block 20 identifies an address of the packet from the packet queue buffer, then takes the packet out of a memory 30 using the packet address identified through the packet queue buffer, and then transmits the packet outside the link.

The memory 30 stores a packet to be transmitted. The memory 30 includes a link queue buffer 100 and a shared buffer 200. The link queue buffer 100 enqueues a buffer having address information on a packet that is stored in a corresponding link queue buffer through the enqueuing block 10.

The link queue buffer 100 is allocated to a buffer of a packet stored in the memory 30 used to transmit the packet.

The shared buffer 200 is allocated when exceeding a minimum buffer threshold value of at least one link queue buffer 100. The link queue buffer 100 and the shared buffer 200 are set with buffer values divided within the capacity of a memory storing a packet.

The buffer state detector 300 determines whether a buffer value stored in a link queue buffer 100 of a corresponding link exceeds a preset minimum buffer threshold value.

If the buffer value stored in the link queue buffer 100 of the link exceeds the minimum buffer threshold value, the buffer manager 400 sets the shared buffer 200 to be included in the link queue buffer 100 of the link.

A detailed description of general function and operation of each of the elements is omitted and a description of operation of the invention is made below.

Figure 3A:
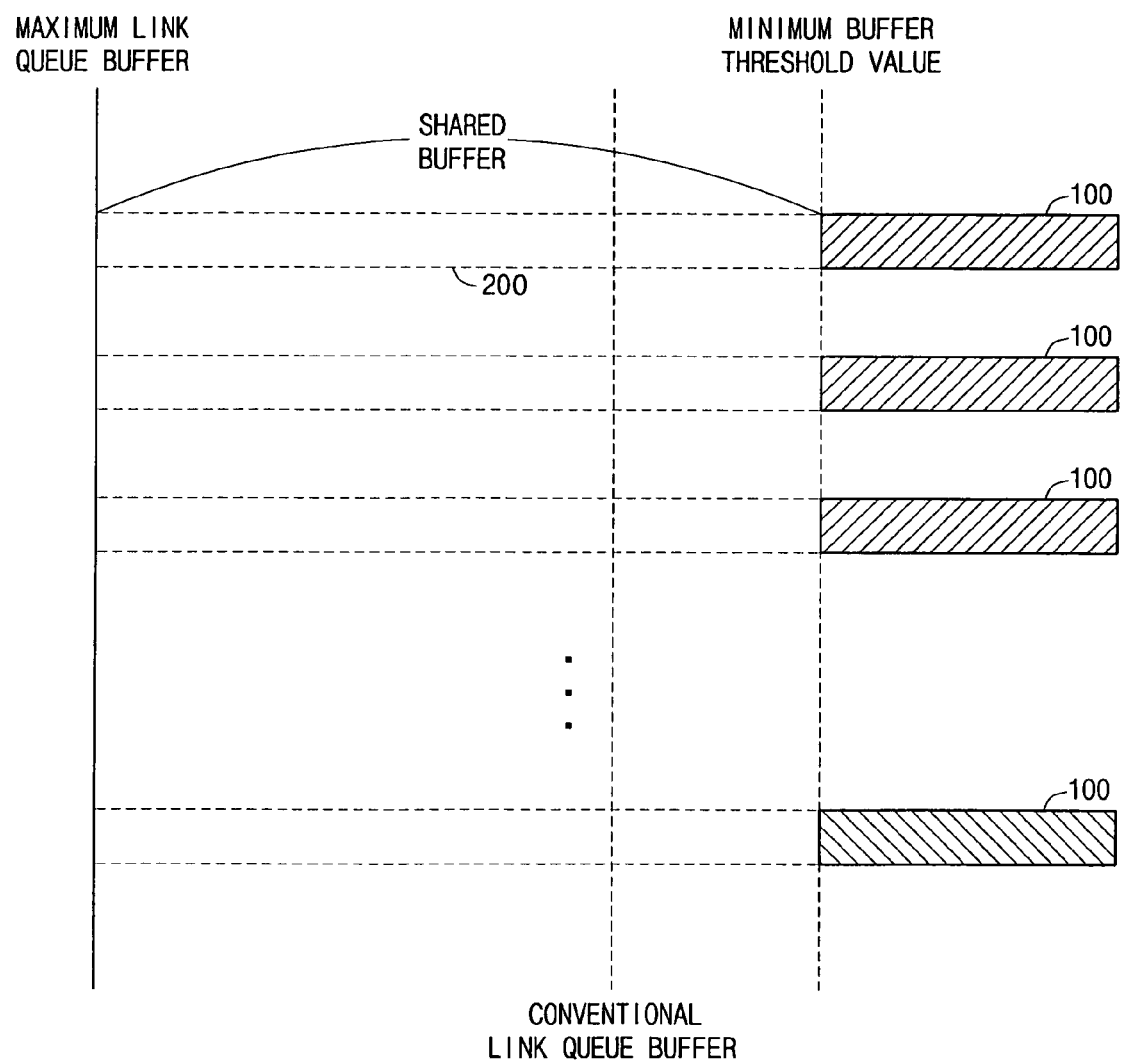
FIG. 3A is a diagram illustrating a minimum setting state of a link queue buffer and a shared buffer in the packet buffer management apparatus of FIG. 2.

First, the buffer manager 400 sets a minimum buffer threshold value to the link queue buffer 100. In detail, as shown in FIG. 3A, at least one link queue buffer 100 is allocated to the minimum buffer threshold value and then, the shared buffer 200 is allocated to a remaining buffer amount.

After that, when a queue number is set to a link queue buffer 100 to queue a packet to have to be transmitted outside, the buffer state detector 300 reads current queue state information (the number of packets and a minimum buffer threshold value currently stored in a queue) of the link queue buffer 100.

Next, the buffer state detector 300 compares the number of packets stored in the link queue buffer 100 with the minimum buffer threshold value of the queue.

Figure 3B:
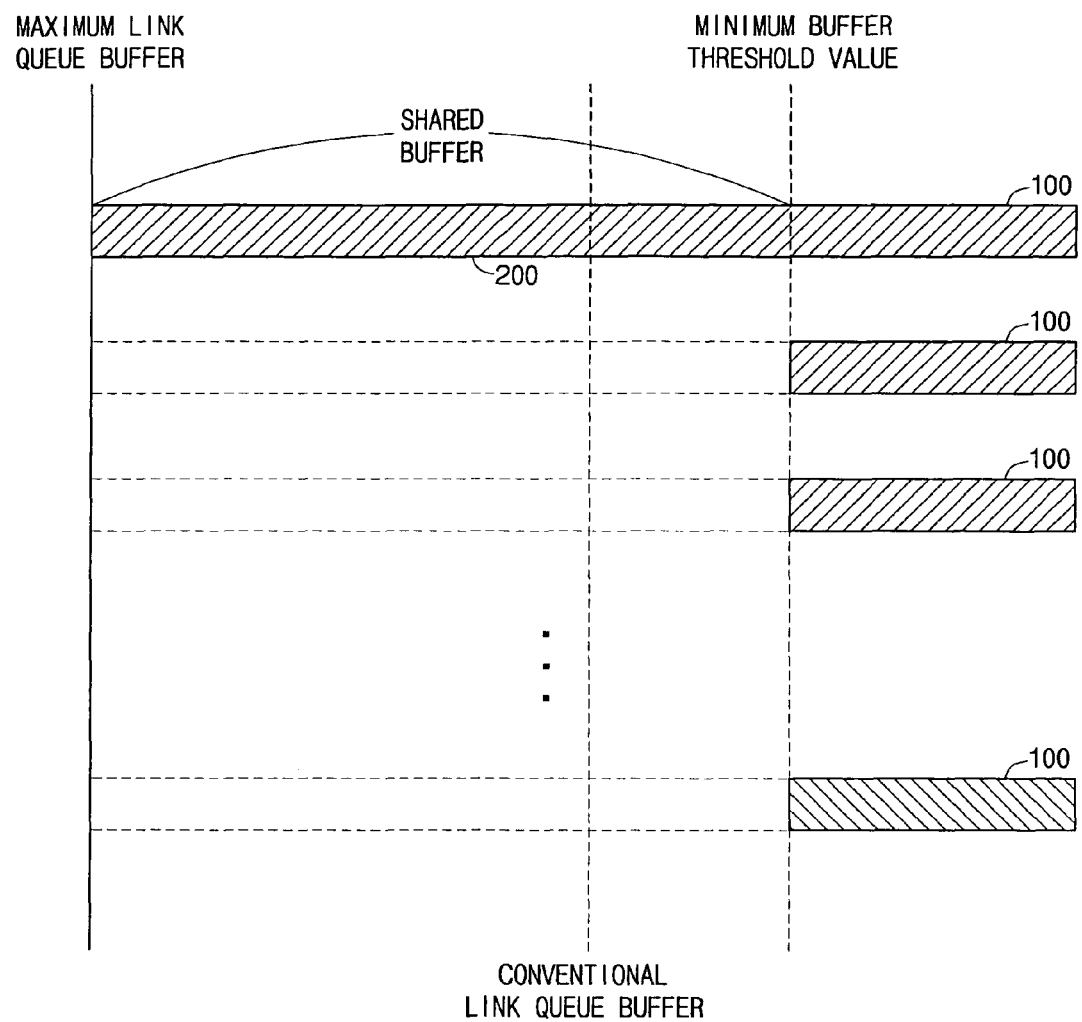
FIG. 3B is a diagram illustrating a state where a link queue buffer and a shared buffer in the packet buffer management apparatus of FIG. 2 are concurrently used.

If the number of packets of the link queue buffer 100 exceeds the preset minimal buffer threshold value, the buffer manager 400 uses the shared buffer 200, without regard for setting of the minimum buffer threshold value of the link queue buffer 100, as shown in FIG. 3B. That is, if the link queue buffer 100 is fully allocated to packets, the shared buffer 200 is used as the link queue buffer 100. Thus, if a packet has to be transmitted outside is generated, the packet is allocated to the shared buffer 200.

By doing so, packets can be prevented from being lost due to the limitation of the capacity of the link queue buffer 100.

If there does not remain sufficient room to store a packet even in the shared buffer 200, the packet is dropped.

If the number of packets of the link queue buffer 100 does not otherwise exceed the preset minimum buffer threshold value, the buffer manager 400 allocates a packet to the link queue buffer 100 without using the shared buffer 200 when the buffer manager 400 identifies that there remains a room to allocate the packet in the link queue buffer 100 using the buffer state detector 300.

Figure 4:
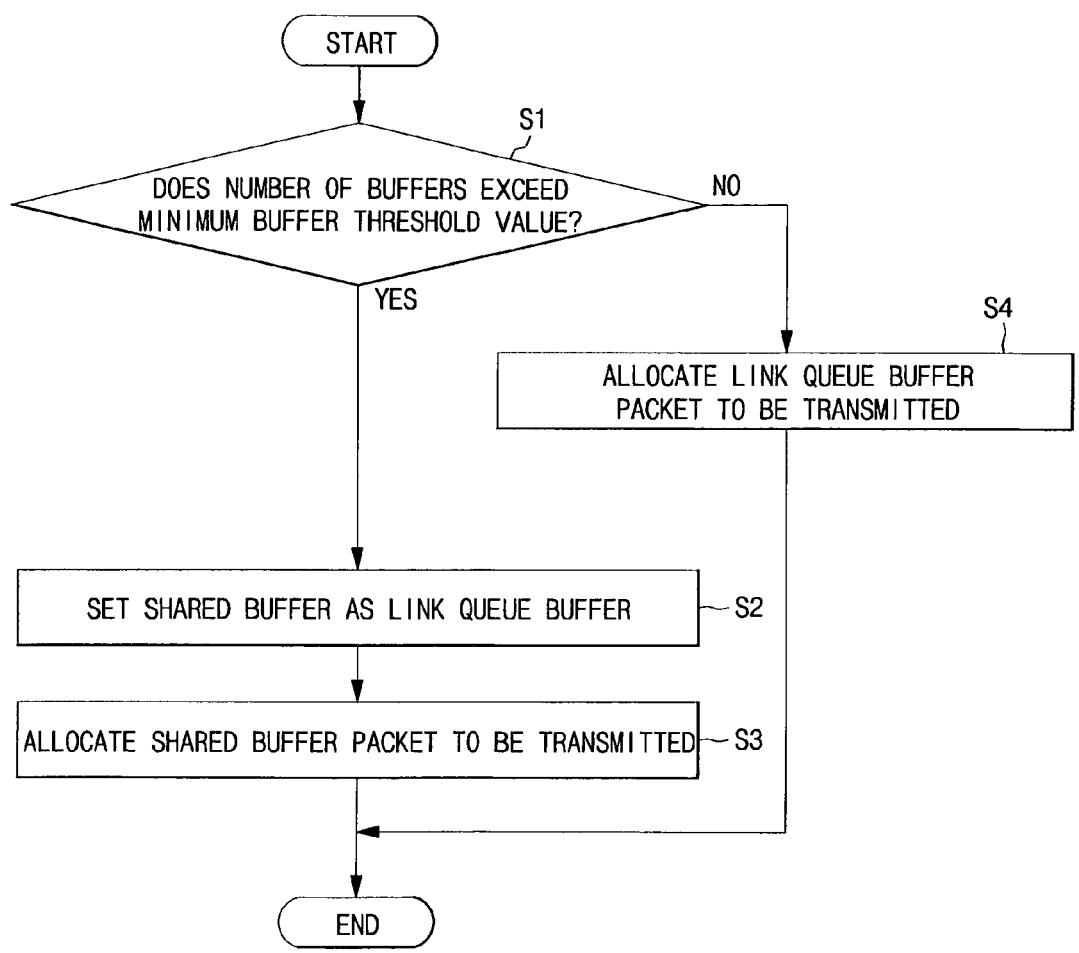
FIG. 4 is a flow diagram illustrating a method for packet buffer management in an IP network system according to the present invention.

A method for packet buffer management in the IP network system according to the present invention is described with reference to FIG. 4.

First, if a packet transmission link is selected, the method determines whether the number of buffers being on transmission standby in a corresponding link queue buffer 100 exceeds a minimum buffer threshold value of a queue (S1).

If the number of buffers exceeds the minimum buffer threshold value, the method sets the shared buffer 200 as the link queue buffer 100 (S2).

After that, the method allocates the shared buffer 200 to a packet to be transmitted (S3).

The procedure (S3) of allocating the shared buffer 200 to the packet to be transmitted is described in detail below with reference to FIG. 5.

First, the process determines whether there remains a packet buffer in the shared buffer 200 (S31).

If there remains a packet buffer in the shared buffer 200, the process allocates a packet to be transmitted to the shared buffer 200 (S32).

If there is not enough space in the packet buffer in the shared buffer 200, the process drops a corresponding packet (S33).

If the number of buffers being in transmission standby state does not exceed the minimum buffer threshold value in S1, the process allocates the link queue buffer 100 to a packet to be transmitted (S4).

The link queue buffer 100 and the shared buffer 200 are set with buffer values divided within a capacity of the memory storing a packet.

As described above, the apparatus and method for packet buffer management in the IP network system according to the present invention have an excellent effect of, upon the occurrence of congestion at the link, reducing a loss of packets caused by the congestion and finally improving a network performance in an end-to-end user zone.

While the present invention has been shown and described in connection with the preferred embodiments, it will be apparent to those skilled in the art that modifications and variations can be made without departing from the spirit and scope of the invention as defined by the appended claims.

What is claimed is:

1. An apparatus for packet buffer management in an Internet protocol network system with at least one port having an internal queue, the apparatus comprising:
　a memory comprising:
　　at least one link queue buffer allocated to a buffer of a packet stored in the memory to transmit the packet; and
　　a shared buffer allocated if a minimum buffer threshold value of the at least one link queue buffer is exceeded;
　a buffer state detector to determine whether a buffer value stored in a link queue buffer of a corresponding link exceeds a minimum buffer threshold value by comparing a number of packets stored in the link queue buffer with the minimum buffer threshold value of the link queue buffer;
　a buffer manager, coupled to the buffer state detector, to set the minimum buffer threshold value of each of the at least one link queue buffer, to set the shared buffer to be comprised in the link queue buffer of the corresponding link if the buffer value stored in the link queue buffer of the corresponding link exceeds the minimum buffer threshold value; and
　a dequeuing block to identify an address of the stored packet, to extract the stored packet from the memory using the address of the stored packet, and to transmit the stored packet,
　wherein the buffer manager is configured to determine whether a packet buffer remains in the shared buffer, to allocate a buffer of the packet to be transmitted to the shared buffer if the packet buffer remains in the shared buffer, and to drop the packet to be transmitted if no packet buffer remains in the shared buffer.

2. The apparatus according to claim 1, wherein the link queue buffer and the shared buffer are set with buffer values divided within a capacity of a memory storing a packet.

3. The apparatus according to claim 1, wherein the buffer manager is configured to allocate the packet to be transmitted to the link queue buffer if the number of packets being on transmission standby in the corresponding link queue buffer does not exceed the minimum buffer threshold value.

4. A method for buffer management in a network system using a link queue buffer and a shared buffer, the method comprising:
　setting a minimum buffer threshold value for at least one link queue buffer;
　upon selecting a packet transmission link, determining whether a number of packets being on transmission standby in a corresponding link queue buffer exceeds the minimum buffer threshold value;
　setting the shared buffer as the corresponding link queue buffer if the number of packets being on transmission standby in the corresponding link queue buffer exceeds the minimum buffer threshold value;
　allocating, to the shared buffer, a packet to be transmitted;
　identifying an address of the packet to be transmitted;
　extracting the packet from the corresponding link queue buffer using the identified address; and
　transmitting the packet,
　wherein allocating, to the shared buffer, the packet to be transmitted comprises:
　　determining whether a packet buffer remains in the shared buffer;
　　allocating, to the shared buffer, a buffer of the packet to be transmitted if the packet buffer remains in the shared buffer; and
　　dropping the packet to be transmitted if no packet buffer remains in the shared buffer.

5. The method according to claim 4, further comprising:
　if the number of packets being on transmission standby in the corresponding link queue buffer does not exceed the minimum buffer threshold value,
　allocating, to the link queue buffer, the packet to be transmitted.

6. The method according to claim 4, wherein the link queue buffer and the shared buffer are set with buffer values divided within a capacity of a memory storing a packet.

* * * * *